(12) United States Patent
Zeng (10) Patent No.: US 6,707,587 B1
(45) Date of Patent: Mar. 16, 2004

(54) METHOD AND APPARATUS FOR PROVIDING TUNABLE SECOND-ORDER POLARIZATION MODE DISPERSION WITH CONSTANT MEAN FIRST-ORDER DIFFERENTIAL GROUP DELAY

(75) Inventor: Ke-Cai Zeng, San Jose, CA (US)

(73) Assignee: Sunrise Telecom Incorporated, San Jose, CA (US)

( * ) Notice: Subject to any disclaimer, the term of this patent is extended or adjusted under 35 U.S.C. 154(b) by 0 days.

(21) Appl. No.: 10/371,775

(22) Filed: Feb. 20, 2003

(51) Int. Cl.$^7$ .............................. G02F 1/01; G02F 1/03; G02B 6/00; G02B 6/26
(52) U.S. Cl. .................. 359/238; 359/239; 359/240; 385/11; 385/27; 385/37
(58) Field of Search .................... 359/238, 239, 359/240, 245, 246, 256; 385/11, 27, 37

(56) References Cited

U.S. PATENT DOCUMENTS

2003/0152322 A1 * 8/2003 Smith et al. ................. 385/27
2003/0161568 A1 * 8/2003 El-Refaei et al. ............. 385/11

OTHER PUBLICATIONS

M. Wegmuller, S. Demma, C. Vinegoni, and N. Gisin, "Emulator of First– and Second–Order Polarization–Mode Dispersion" *IEEE Photonics Technology Letters*, vol. 14, No. 5, pp. 630–632, May 2002.

Frank Bruyere, "Impact of First– and Second–Order PMD in Optical Digital Transmission Systems" *Optical Fiber Technology*, 2, Art. No. 0033, pp. 269–280, 1996.

Philippe Ciprut, B. Gisin, Nicolas Gisin, Rogerio Passy, J.P. Von der Weid, F. Prieto, and Christian W. Zimmer, "Second–Order Polarization Mode Dispersion: Impact on Analog and Digital Transmissions," *J. Lightwave Technol.*, vol. 16, No. 5, pp. 757–771, May 1998.

* cited by examiner

*Primary Examiner*—Jordan M. Schwartz
*Assistant Examiner*—Timothy J Thompson
(74) *Attorney, Agent, or Firm*—Mikio Ishimaru (57) ABSTRACT

A method and apparatus for providing tunable second-order polarization mode dispersion with constant mean first-order differential group delay for fiber optic transmission systems are provided. A section of fixed high birefringent optical fiber, a polarization controller, and a variable differential group delay module are provided. The polarization controller is connected to the high birefringent optical fiber section, and the variable differential group delay module is connected to the polarization controller. The variable differential group delay module is controlled to vary the second-order polarization mode dispersion values at an output of the high birefringent optical fiber section. The polarization controller is controlled to hold the mean first-order differential group delay substantially constant at the output of the high birefringent optical fiber section for each value of the second-order polarization mode dispersion at the output of the high birefringent optical fiber section.

20 Claims, 2 Drawing Sheets

METHOD AND APPARATUS FOR PROVIDING TUNABLE SECOND-ORDER POLARIZATION MODE DISPERSION WITH CONSTANT MEAN FIRST-ORDER DIFFERENTIAL GROUP DELAY

TECHNICAL FIELD

The present invention relates generally to the field of telecommunications and more particularly to fiber optic transmission systems.

BACKGROUND ART

The extremely high communications bandwidth of fiber optics technology and transmission systems has revolutionized telecommunications. A single beam of modulated laser light can carry vast amounts of information equaling hundreds of thousands of phone calls or hundreds of video channels. Bandwidth capabilities have been more than doubling every two to three years.

A fiber optic transmission system typically includes the optical transmitter, an optical fiber, an optical amplifier, and an optical receiver.

The optical transmitter receives an electrical digital signal and converts it into an optical signal by modulating a laser light into optical signal pulses that represent the various values or states of the electrical digital signal.

The optical signal pulses are transmitted through the optical fiber and, generally, are amplified by one or more optical amplifiers before being converted back into electrical digital signals by the optical receiver. This is generally referred to as the optical link or optical channel.

The optical signal pulses arriving at the optical receiver must be of sufficient quality to allow the optical receiver to clearly distinguish the on-and-off pulses of light signals sent by the optical transmitter. However, noise, attenuation, and dispersion are a few of the impairments that can distort the optical signal pulses, rendering the optical signal pulses marginal or unusable at the optical receiver and making it difficult or impossible to accurately detect or reconstitute the electrical digital signal. This distortion nonuniformly broadens, spreads, or widens the various optical signal pulses, reducing the spacing between the pulses or causing them to overlap, thereby rendering them virtually indistinguishable.

Conventionally, a properly designed optical channel can maintain a Bit Error Rate ("BER") of. $10^{-13}$ or better. When an optical channel degrades to a BER of $10^{-8}$, a telecommunications system may automatically switch to an alternate optical channel in an attempt to improve the BER. Otherwise, the telecommunications system must operate at a reduced or lowered bandwidth, with poorer overall system performance.

Dispersion is a major contributor to distortion of optical signal pulses, leading to increases in the BER The distortion caused by dispersion generally increases with increases in the bandwidth or data rate, and with increases in the optical fiber transmission distance.

Dispersion has generally been identified as being caused by (1) chromatic dispersion, or (2) Polarization Mode Dispersion ("PMD").

Chromatic dispersion occurs when the various frequency components, or colors, of the optical signal pulse travel at different speeds through the optical fiber and arrive at the optical receiver at different times. This occurs because the index of refraction of a material, such as the optical fiber, varies with frequency or wavelength. As a result, the optical signal pulses are distorted through chromatic frequency-related pulse spreading.

Some of the major solutions for chromatic dispersion have included: (1) single-mode propagation, (2) Distributed Feedback ("DFB") lasers with narrow output spectra, and (3) low attenuation/modificd-dispersion optical fibers. All of these advances have contributed to increased bandwidth by allowing the optical signal pulses to pass through the optical fiber with relatively low or reduced dispersion, and hence, relatively low or reduced optical signal distortion.

Single-mode propagation (or use of narrow wavelengths) was achieved through the development of single-mode optical fiber. This optical fiber allows only a single mode of light to propagate through the optical fiber. The DFB laser provides a light source to use with single-mode optical fibers. The DFB laser produces a light with an extremely narrow distribution of output frequencies and wavelengths, minimizing the chromatic dispersion problem. The low attenuation/modified-dispersion optical fiber provides a dispersion-shifted optical fiber that minimizes the speed-vs-wavelength dependency at a specific wavelength.

Previously, chromatic dispersion received greater attention because its adverse effects were initially more limiting at lower available bandwidths and data rates. Now, PMD receives considerable attention due to its potential limitation on optical transparent high-speed long-distance light wave systems, as well as on multi-channel cable television ("CATV") transmission systems.

PMD refers to distortions in the two orthogonal (right angle) light wave components of the polarized light signal pulses emitted by the optical transmitter. In an ideal optical fiber, which has a perfectly circular cross-section and is free from external stresses, the propagation properties of the two polarized light signal components are identical. However, imperfections introduced in the manufacturing process may result in an optical fiber that is not perfectly circular. In addition, an optical fiber that has been installed may suffer from external stresses such as pinching or bending. These manufacturing imperfections and external stresses cause the two polarization components of the polarized light pulses to have different propagation characteristics, which in turn give rise to PMD.

Despite the manufacturing-induced imperfections, optical fibers (for each optical frequency ω) have two input states ("principal states of polarization", or "PSP's") in which a matching light pulse will undergo no PMD spreading. However, light pulses can be input into a fiber in an arbitrary state, and this leads to the pulses being split into two components that propagate independently through the fiber at different velocities. When these components reach the end of the fiber they recombine as two sub-pulses split in time. The delay between the two sub-pulses is designated as the differential group delay ("DGD"), τ.

The DGD and the PSP's of a long fiber are not only dependent on the wavelength or frequency of the optical pulses, but they also fluctuate in time as a result of environmental variations such as temperature changes, external mechanical constraints, and so forth. Their behavior is random, both as a function of wavelength at a given time and as a function of time at a given wavelength.

In a fiber optic transmission system, the optical pulse signal has a bandwidth or range of optical frequencies. "Second-order PMD" describes the change of PMD with changing optical frequency, and is seen as both (i) a changing DGD with the changing optical frequency, and (ii) a changing output polarization with the changing optical frequency.

The impact of first- and second-order PMD in high bit rate (10 Gb/s) systems has been analyzed. It was found that the second-order PMD could lead to important performance losses in addition to the performance penalties caused by the first-order PMD. For the case of large values of chromatic dispersion, second-order PMD becomes in fact a major source of performance degradation. Moreover, with the advent of PMD compensators, which typically compensate for the first-order effects only (leaving higher orders unaffected or even increasing them), impairments due to accumulated second-order PMD are to be expected.

Second-order PMD is an important issue for a proper assessment of system performance. To emulate the real world fiber, a PMD emulator should not only include the first, but also the second-order. Today's emulators have the strategy to mimic as closely as possible the behavior of long standard fibers with strong polarization mode coupling, both in the time and frequency (wavelength) domain. However, the instantaneous PMD (DGD and second-order) value of these PMD emulators is unknown.

Therefore, it is very clear that it is important not only to have controllable first-order DGD, but it is also increasingly necessary to enable methods and apparatus for providing tunable second-order PMD. This is essential for the thorough study, analysis, and testing of real world fiber installations, for a proper assessment of the PMD (including both first-order DGD and higher order PMD) induced system penalty, and for the test and analysis of PMD compensators and other optical network components with PMD. There is a particular need for methods and apparatus that can provide tunable second-order PMD while keeping the mean first-order DGD constant.

Solutions to problems of this sort have been long sought, but have long eluded those skilled in the art.

DISCLOSURE OF THE INVENTION

The present invention provides a method and apparatus for providing tunable second-order polarization mode dispersion with constant mean first-order differential group delay for fiber optic transmission systems. A section of fixed high birefringent optical fiber, a polarization controller, and a variable differential group delay module are provided. The polarization controller is connected to the high birefringent optical fiber section, and the variable differential group delay module is connected to the polarization controller. The variable differential group delay module is controlled to vary the second-order polarization mode dispersion values at an output of the high birefringent optical fiber section. The polarization controller is controlled to hold the mean first-order differential group delay substantially constant for each value of the second-order polarization mode dispersion at the output of the high birefringent optical fiber section. The tunable second-order polarization mode dispersion with constant mean first-order differential group delay of the present invention provides substantial operational and real-time advantages previously unavailable for high-speed fiber optic transmission systems.

Certain embodiments of the invention have other advantages in addition to or in place of those mentioned above. The advantages will become apparent to those skilled in the art from a reading of the following detailed description when taken with reference to the accompanying drawings.

BEST MODE FOR CARRYING OUT THE INVENTION

An important characteristic of optical fibers is that, for any given optical frequency $\omega$, one can always find two orthogonal input principal states of polarization ("PSP's") such that a light pulse, having its input state of polarization ("SOP") matched with the input PSP, undergoes no spreading. However, an input light pulse with an arbitrary SOP can always be decomposed into two sub-polarization components aligned with each of the two axes of the orthogonal PSP's. The two components, propagating independently through the fiber at different group velocities, will recombine at the end of the fiber as a superposition of two sub-pulses split in time. The delay between those two sub-pulses is designated as the differential group delay ("DGD"), $\tau$. A natural measure of PMD is the PMD vector $\vec{\Omega}(\omega)$, which is dependent on the optical frequency $\omega$. The magnitude of the PMD vector $\vec{\Omega}(\omega)$ is equal to the DGD between the two PSP's, $|\vec{\Omega}(\omega)|=\tau$, while its direction determines the direction of the two orthogonal PSP's, $$\frac{\pm\vec{\Omega}(\omega)}{|\vec{\Omega}(\omega)|}.$$

However, the DGD and PSP's of a long fiber are dependent on wavelength and fluctuate in time as a result of environmental variations such as temperature variations, external mechanical constraints, etc. Their behavior is random, both as a function of wavelength at a given time and as a function of time at a given wavelength. Fortunately, this behavior can be characterized statistically. It can be demonstrated that the probability density function ("PDF") of the randomly changing DGD values in a real fiber follows a Maxwellian Density Distribution. By definition, PMD is its rms value; that is: PMD=$\sqrt{\langle DGD^2 \rangle}$. It is essential to keep in mind that DGD fluctuates in time and can be either smaller or larger than its rms value or PMD.

In the fiber optic transmission system, the optical pulse signal has a bandwidth or range of optical frequencies. "Second-order PMD" describes the change of PMD with frequency and is manifested by (i) a changing DGD with the frequency, and (ii) a rotation of the PSP's on the Poincare Sphere with frequency, which will result in a changing output polarization with changing optical frequency.

The impact of first- and second-order PMD in high bit rate (10 Gb/s) systems has been analyzed. It was found that the second-order PMD could lead to important fluctuations around the mean penalties induced by the first-order PMD. For the case of large values of chromatic dispersion, second-order PMD becomes in fact a major source of performance degradation. Moreover, with the advent of PMD compensators, which typically compensate for the first-order effects only (leaving higher orders unaffected or even increasing them), impairments due to accumulated second-order PMD are to be expected.

Second-order PMD is an important issue for a proper assessment of system performance. To emulate the real world fiber, a PMD emulator should not only include the first, but also the second-order. Today's emulators have the strategy to mimic as closely as possible the behavior of long standard fibers with strong polarization mode coupling, both in the time and frequency (wavelength) domains. They typically consist of many segments of high birefringent fibers concatenated by rotatable connectors or polarization scramblers. However, the instantaneous PMD (DGD and second-order) value of these PMD emulators is unknown.

Therefore, it is very clear that for a thorough study, analysis, and test of real world fiber installations, for a proper assessment of the PMD (including both first-order DGD and higher order PMD) induced system penalties, and for the test and analysis of PMD compensators and other optical network components with PMD, not only is it important to be able to have controllable first-order DGD, but it is also increasingly necessary to enable methods and apparatus for providing tunable second-order PMD. There is a particular need for methods and apparatus that can provide tunable second-order PMD while keeping the mean first-order DGD constant.

Figure 1:
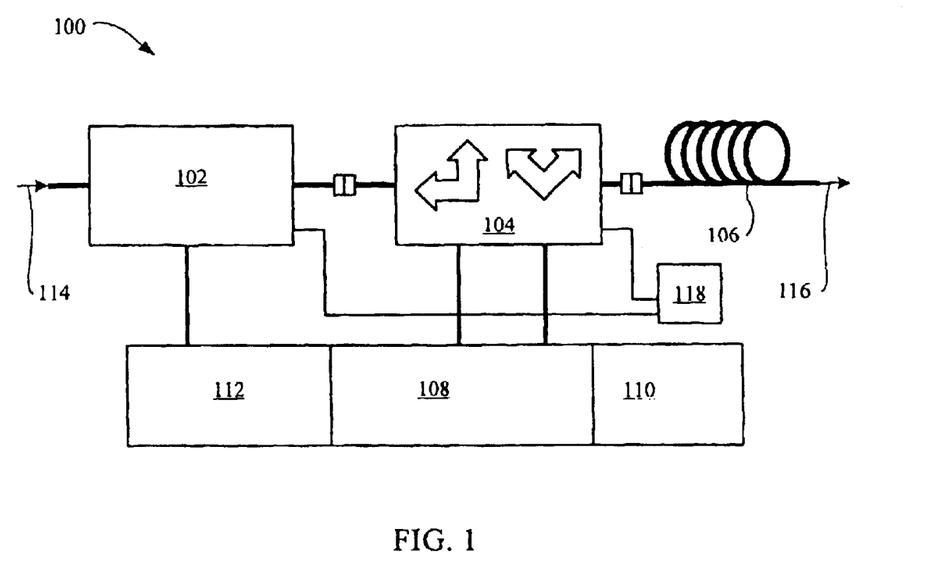
FIG. 1 is a schematic of a system for providing constant mean first-order differential group delay and tunable second-order polarization mode dispersion in accordance with the present invention.

Referring now to FIG. 1, therein is shown, in schematic form, a system 100 for providing tunable second-order polarization mode dispersion ("PMD") according to the present invention. The system 100 includes a variable Differential Group Delay ("DGD") module 102, a polarization controller 104, and an optical fiber section 106. The polarization controller 104 is a programmable 2-axis polarization controller, and the optical fiber section is a segment of fixed high birefringent ("HiBi") optical fiber.

The variable DGD module 102, the polarization controller 104, and the HiBi optical fiber section 106 are spliced together in this order, as shown, with the polarization controller 104 being between the variable DGD module 102 and the HiBi optical fiber section 106.

In one embodiment, the variable DGD module 102 has a DGD value, $\tau_{variable}$, which is tunable from a $\tau_{variable}^{min}$ of 0.68 ps to a $\tau_{variable}^{max}$ of 45.18 ps. The HiBi optical fiber section 106 has a fixed DGD value, $\tau^{fixed}$, which is preset at different fixed values depending on the maximum second-order PMD value to be provided. In this embodiment, the HiBi fiber has a fixed DGD value of about 32.5 ps. A suitable variable DGD module is available, for example, from General Photonics.

For the polarization controller 104, suitable programnable polarization controllers are available, for example, from Corning, General Photonics, Optellios, and others. The phase angle of the wave-plate of such polarization controllers can be controlled in known fashion by a conventional digital-to-analog ("DIA") converter, such as a D/A converter 108 under the control of a CPU 110, which also controls the variable DGD module 102 through a digital I/O 112 connected thereto as shown in FIG. 1.

For the HiBi optical fiber section 106, suitable high birefringent optical fibers are available, for example, from Coming (PureMode™ 15-U 40), Fujikura (SM.15-P-8/125-UV/U-400), and Fibercore (HB 1500T).

The optical link in the variable DGD module 102 opposite the polarization controller 104 then serves as an input 114 for the system 100, and the end of the HiBi optical fiber section 106 opposite the polarization controller 104 then serves as an output 116 for the system 100.

Power supplies are provided as appropriate, such as a DC power supply 118 for the variable DGD module 102 and the polarization controller 104.

To understand the invention from a theoretical standpoint, assume that the system 100 can be simplified as two sections, Section 1 and Section 2. Section 1 includes the variable DGD module 102 and the polarization controller 104. Section 2 is the HiBi optical fiber section 106 itself.

Assume the coupling angle between the PSP of Section 1 and that of Section 2 is $\phi$. The overall PMD vector of the system, $\vec{\Omega}_{total}$, can then be described as:

$$\Omega_{total}(\omega) = \tau_{fixed}\vec{e}_2 + \tau_{variable}$$

$$(\vec{e}_1 \cdot \vec{e}_2)\vec{e}_2$$

$$+\tau_{variable}\cos(\tau_{fixed}\omega)(\vec{e}_1$$

$$-(\vec{e}_1 \cdot \vec{e}_2)\vec{e}$$

$$_2) + \tau_{variable}$$

$$\sin(\tau_{fixed}\omega)(\vec{e}$$

$$_1 \times \vec{e}_2) \qquad (1)$$

where $\vec{\Omega}_{variable} = \tau_{variable}\vec{e}_1$ is the polarization mode dispersion vector of Section 1 and $\vec{\Omega}_{fixed} = \tau_{fixed}\vec{e}_2$ is the polarization mode dispersion vector of the HiBi optical fiber section 106. It can be assumed that the two polarization mode dispersion vectors are independent of wavelength (a very good first-order approximation for HiBi optical fibers and commonly used variable DGD modules). According to equation (1), the total amount of first-order DGD can then be calculated as:

$$DGD_{total}^2 = \tau_{variable}^2 = \tau_{fixed}^2 + 2\tau_{variable}\tau_{fixed}\cos(\phi), \qquad (2)$$

According to equation (1), the amount of second-order PMD can also be calculated as:

$$\left|\frac{\partial}{\partial \omega}\vec{\Omega}_{total}(\omega)\right| \propto \frac{1}{2}\tau_{variable}\tau_{fixed}|\sin(\phi)|, \qquad (3)$$

Now considering the residual second-order PMD contribution, $\Omega_0$, from both the variable DGD module 102 and the HiBi optical fiber section 106, equation (2) can be further modified as:

$$\left|\frac{\partial}{\partial \omega}\vec{\Omega}_{total}(\omega)\right| = |\vec{\Omega}_\omega| \propto \frac{1}{2}\tau_{variable}\tau_{fixed}|\sin(\phi)| + \Omega_0, \qquad (4)$$

where $\Omega_0$ is a constant. According to equation (2), for each value of the variable DGD module 102, $\tau_{variable}$, by adjusting the coupling angle $\phi$ between Section 1 and Section 2 to keep the value of $\cos(\phi)$ to be $$-\frac{\tau_{variable}}{2\tau_{fixed}} (\tau_{variable} \leq 2\tau_{fixed}),$$

then the $DGD_{total}$ of the system 100 is equal to $\tau_{fixed}$ and is a constant for all values of $\tau_{variable}$. Inserting $$\cos(\phi) = -\frac{\tau_{variable}}{2\tau_{fixed}}$$

into equation (4), then yields:

$$|\vec{\Omega}_\omega| \propto \frac{1}{2}\tau_{variable}\tau_{fixed}\sqrt{1 - \frac{\tau_{variable}^2}{4\tau_{fixed}^2}} + \Omega_0, (\tau_{variable} \leq 2\tau_{fixed}). \quad (5)$$

According to equation (5), a maximum second-order PMD value, $|\vec{\Omega}_\omega|^{max}$, is achieved with $\tau_{variable} = \sqrt{2}\tau_{fixed}$. Thus, if $DGD_{total}$ of the system is adjusted to be at a constant value of $\tau_{fixed}$, the maximum second-order PMD value that the system can provide is $$|\vec{\Omega}_\omega|^{max} \propto \frac{1}{2}\tau_{fixed}^2 + \Omega_0.$$

In conclusion, equation (5) predicts that the system can provide a second-order PMD value tunable from $\Omega_0$ to $$\frac{1}{2}\tau_{fixed}^2 + \Omega_0$$

if the variable DGD module 102 is variable from 0 to $\sqrt{2}\tau_{fixed}$, while its mean first-order DGD is kept at a constant value.

In operation, the system 100 is set up as follows. Initially, the polarization controller 104 is calibrated relative to the variable DGD module 102 so that for each setting or value of the variable DGD module 102, the polarization controller 104 is tuned to a corresponding phase angle setting that keeps the mean first-order DGD substantially constant at the output 116. This calibration information is stored in the CPU 110 so that the polarization controller 104 is then automatically calibrated under the control of the CPU 10 for tracking each setting of the variable DGD module 102.

Once the system 100 is calibrated, it is ready for use, and the DGD module can then be tuned to provide the desired second-order PMD output (within the range of the system 100) while the first-order DGD automatically remains substantially constant due to the corresponding automatic adjustment of the polarization controller 104. Further, the second-order PMD output of the system 100 can then be calibrated with each tuned setting of the variable DGD module 102 so that a particular desired second-order PMD value can then be selected and provided by the system 100 by tuning the variable DGD module 102 to the corresponding setting without having to actually measure the output of the system 100. For example, a desired second-order PMD value can be input into the CPU 110 and the CPU 110 software will then tune the variable DGD module 102 and the polarization controller 104 to the corresponding settings to provide that second-order PMD value at the output 116 while keeping the mean first-order DGD fixed.

In one example (showing results consistent with equation (5)), the system 100 was configured for tunable second-order PMD in the 1500 nm to 1600 nm wavelength range. The DGD value of the variable DGD module 102 was variable from 0.68 ps to 45.18 ps, with a minimum resolution of about 1.4 ps. A Corning PureMode™ 15-U40 PM fiber segment was used for the HiBi optical fiber section 106, having a DGD value, $\tau_{fixed}$, chosen to be about 32.5 ps (verified by a commercial PMD analyzer). The polarization controller 104 was a programmable 2-axis polarization controller.

Calibrations were initially done in this example to enable the system 100 to provide tunable second-order PMD values while automatically holding the mean first-order DGD substantially constant. In the calibration phase, for each value of the variable DGD module 102, the controlling voltages of the two axes of the polarization controller 104 were adjusted by means of the D/A converter 108, such that the mean first-order DGD of the system 100, $DGD_{total}$, was kept at a constant value of about 32.5 ps. Calibrated voltages were then saved into the controlling software of the CPU 110. As a result, the system 100 was then able to provide any desired second-order PMD value within the available range by setting the variable DGD module 102 at a corresponding value (between 0 and $\sqrt{2}_{fixed}$) defined by equation (5). The minimum resolution of the system 100 in this case was approximately 22.4 ps² due to the resolution of the variable DGD module 102.

In this configuration, the available range of second-order PMD values of the system 100 was tunable from about 37 ps² to about 522 ps² when the variable DGD module 102 was tuned from 0.68 ps to 45.18 ps, with the mean DGD of the system 100 remaining constant at about 32.5 ps for the various different second-order PMD values. It is noteworthy that although both the fixed HiBi optical fiber section 106 and the variable DGD module 102 each has negligible second-order PMD by itself, the system 100 as a whole generates desirable amounts of second-order PMD values.

Figure 2:
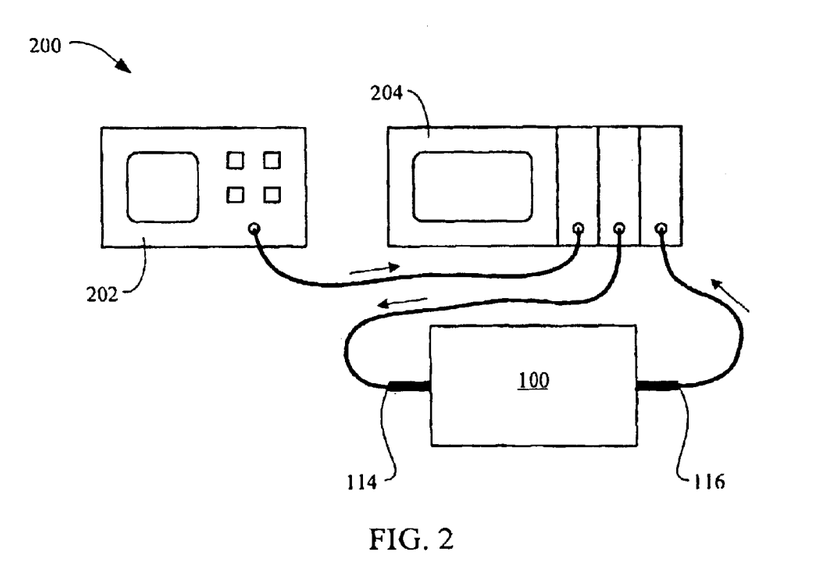
FIG. 2 is a schematic for measuring and calibrating the system of FIG. 1 in accordance with the present invention.

Referring now to FIG. 2, therein is shown a schematic 200 for measuring and calibrating the system 100. As illustrated, a tunable laser 202 provides test optical signals to a PMD analyzer 204, which in turn is connected to the system 100 of the present invention. A suitable tunable laser is available from Agilent (model 8163 A), and a suitable PMD analyzer is available from Profile (Pat 9000 B with a 9300 Polarizer).

The test optical signals are generated by the tunable laser 202 as described above, initially measured for later comparison by the PMD analyzer 204, passed through the system 100 (i.e., through the variable DGD module 102, the polarization controller 104, and the HiBi optical fiber section 106) by means of the input 114 and the output 116 thereof. The resultant signals are returned to the PMD analyzer 204 to compare the signal with that originally generated by the tunable laser 202 for determining the first-order DGD and the second-order PMD values.

Figure 3:
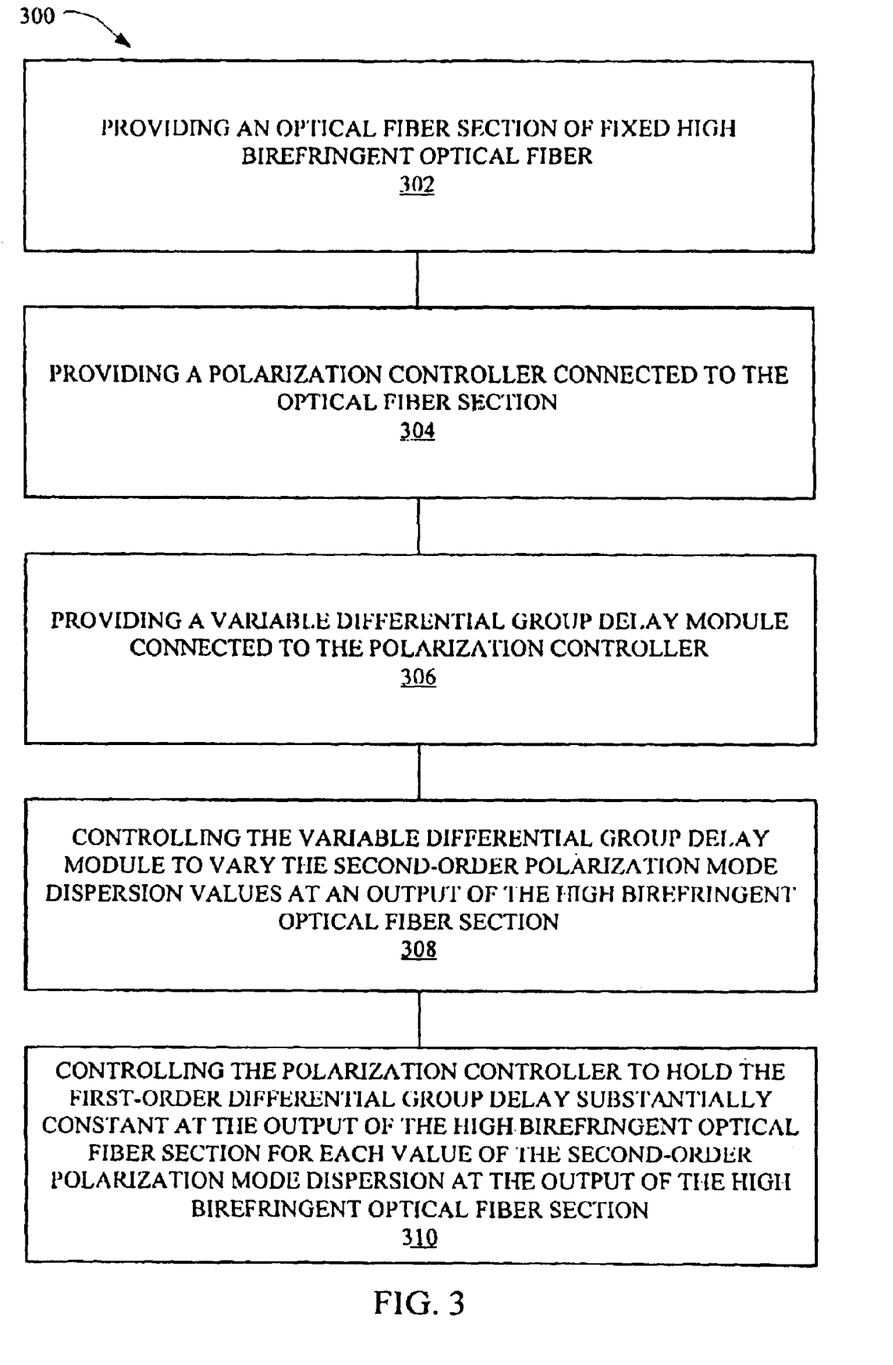
FIG. 3 is a flow chart of a method for providing tunable second-order polarization mode dispersion with constant mean first-order differential group delay.

Referring now to FIG. 3, therein is shown a flow chart of a method 300 for providing tunable second-order PMD for fiber optic transmission in accordance with the present invention. The method includes a step 302 of providing an optical fiber section of fixed high birefringent optical fiber; a step 304 of providing a polarization controller connected to the optical fiber section; a step 306 of providing a variable differential group delay module connected to the polarization controller; a step 308 of controlling the variable differential group delay module to vary the second-order polarization mode dispersion values at an output of the high birefringent optical fiber section; and a step 310 of controlling the polarization controller to hold the mean first-order differential group delay substantially constant at the output of the high birefringent optical fiber section for each value of the second-order polarization mode dispersion at the output of the high birefringent optical fiber section.

It has been discovered that the present invention thus furnishes numerous important and heretofore unavailable advantages, and provides significant new and heretofore unknown solutions and capabilities for high bit rate fiber optical network systems. Principle among these is that the system 100 (tunable second-order PMD module) provides known and repeatable variable second-order PMD values while the mean first-order DGD value is kept constant.

A particularly important advantage of the present invention is that these results are provided in use without having to measure or monitor either of the first-order DGD or the second-order PMD values.

Another advantage of the present invention is the discovery that it can be linked to study the corresponding system penalty in 10 Gbyte/s and/or higher data rates optical networks.

Still another advantage is that the invention can also be used to evaluate the performances of various PMD compensators and other optical network components having PMD.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters hither-to-fore set forth herein or shown in the accompanying drawings are to be interpreted in an illustrative and non-limiting sense.

The Invention claimed is:

1. A method for providing tunable second-order polarization mode dispersion for fiber optic transmission, comprising:
   providing an optical fiber section of fixed high birefringent optical fiber;
   providing a polarization controller connected to the optical fiber section;
   providing a variable differential group delay module connected to the polarization controller;
   controlling the variable differential group delay module to vary the second-order polarization mode dispersion values at an output of the high birefringent optical fiber section; and
   controlling the polarization controller to hold the mean first-order differential group delay substantially constant at the output of the high birefringent optical fiber section for each value of the second-order polarization mode dispersion at the output of the high birefringent optical fiber section.

2. The method of claim 1 further comprising calibrating the polarization controller relative to the variable differential group delay module by:
   tuning the variable differential group delay module to a predetermined differential group delay value; and
   tuning the polarization controller to a corresponding phase angle setting that keeps the mean first-order differential group delay substantially constant at a predetermined value at the output of the high birefringent optical fiber section.

3. The method of claim 2, further comprising:
   storing the corresponding phase angle settings for each setting of the variable differential group delay module; and
   tuning the polarization controller to the stored phase angle corresponding to the setting of the variable differential group delay module.

4. The method of claim 2 further comprising measuring and calibrating the polarization controller relative to the variable differential group delay module by:
   providing a tunable laser for providing test optical signals;
   providing a polarization mode dispersion analyzer connected to the tunable laser, to the input to the variable differential group delay module, and to the output of the high birefringent optical fiber section;
   initially measuring the optical signal generated by the tunable laser;
   passing the optical signal from the tunable laser through the variable differential group delay module, the polarization controller, and the high birefringent optical fiber section; and
   analyzing the resultant optical signal using the polarization mode dispersion analyzer to compare the resultant signal with that originally generated by the tunable laser, to determine the first-order differential group delay and the second-order polarization mode dispersion values.

5. The method of claim 1 further comprising:
   calibrating the second-order polarization mode dispersion value at the output of the high birefringent optical fiber section for each setting of the variable differential group delay module; and
   selecting a second-order PMD value by tuning the variable differential group delay module to the corresponding setting without actually measuring the resulting second-order polarization mode dispersion value at the output of the high birefringent optical fiber section.

6. A method for providing tunable second-order polarization mode dispersion for fiber optic transmission, comprising:
   providing an optical fiber section of fixed high birefringent optical fiber;
   providing a polarization controller optically connected to the fixed high birefringent optical fiber section;
   providing a variable differential group delay module optically connected to the polarization controller;
   inputting optical signals into the variable differential group delay module;
   passing the optical signals from the variable differential group delay module to the polarization controller;
   passing the optical signals from the polarization controller to the fixed high birefringent optical fiber section;
   outputting the optical signals from an output of the fixed high birefringent optical fiber section;
   controlling the variable differential group delay module to vary the second-order polarization mode dispersion values at the output of the fixed high birefringent optical fiber section; and
   controlling the polarization controller to hold the mean first-order differential group delay substantially constant at the output of the fixed high birefringent optical fiber section for each value of the second-order polarization mode dispersion at the output of the fixed high birefringent optical fiber section.

7. The method of claim 6 further comprising calibrating the polarization controller relative to the variable differential group delay module by:
   tuning the variable differential group delay module to a predetermined differential group delay value; and
   tuning the polarization controller to a corresponding phase angle setting that keeps the mean first-order differential group delay substantially constant at a predetermined value at the output of the fixed high birefringent optical fiber section.

8. The method of claim 7, further comprising:
   storing the corresponding phase angle settings for each setting of the variable differential group delay module; and
   tuning the polarization controller to the stored phase angle corresponding to the setting of the variable differential group delay module.

9. The method of claim 7 further comprising measuring and calibrating the polarization controller relative to the variable differential group delay module by:
- providing a tunable laser for providing test optical signals;
- providing a polarization mode dispersion analyzer connected to the tunable laser, to the input to the variable differential group delay module, and to the output of the fixed high birefringent optical fiber section;
- initially measuring the optical signal generated by the tunable laser;
- passing the optical signal from the tunable laser through the variable differential group delay module, the polarization controller, and the fixed high birefringent optical fiber section; and
- analyzing the resultant optical signal using the polarization mode dispersion analyzer to compare the resultant signal with that originally generated by the tunable laser, to determine the first-order differential group delay and the second-order polarization mode dispersion values.

10. The method of claim 6 further comprising:
- calibrating the second-order polarization mode dispersion value at the output of the high birefringent optical fiber section for each setting of the variable differential group delay module; and
- selecting a second-order PMD value by tuning the variable differential group delay module to the corresponding setting without actually measuring the resulting second-order polarization mode dispersion value at the output of the high birefringent optical fiber section.

11. A tunable second-order polarization mode dispersion system for fiber optic transmission, comprising:
- an optical fiber section of fixed high birefringent optical fiber;
- a polarization controller connected to the optical fiber section;
- a variable differential group delay module connected to the polarization controller, the variable differential group delay module including a control to vary the second-order polarization mode dispersion values at an output of the high birefringent optical fiber section, and the polarization controller including a control to hold the mean first-order differential group delay substantially constant at the output of the high birefringent optical fiber section for each value of the second-order polarization mode dispersion at the output of the high birefringent optical fiber section.

12. The system of claim 11 further comprising circuitry for calibrating the polarization controller relative to the variable differential group delay module, including:
- circuitry for tuning the variable differential group delay module to a predetermined differential group delay value; and
- circuitry for tuning the polarization controller to a corresponding phase angle setting that keeps the mean first-order differential group delay substantially constant at a predetermined value at the output of the high birefringent optical fiber section.

13. The system of claim 12, further comprising:
- circuitry for storing the corresponding phase angle settings for each setting of the variable differential group delay module; and
- circuitry for tuning the polarization controller to the stored phase angle corresponding to the setting of the variable differential group delay module.

14. The system of claim 12 further comprising:
- a tunable laser for providing test optical signals; and
- a polarization mode dispersion analyzer connected to the tunable laser, to the input to the variable differential group delay module, and to the output of the high birefringent optical fiber section, the polarization mode dispersion analyzer being operable for initially measuring the optical signal generated by the tunable laser, and being operable for analyzing the optical signal at the output of the high birefringent optical fiber section to compare the signal at the output of the high birefringent optical fiber section with the signal originally generated by the tunable laser, to determine the first-order differential group delay and the second-order polarization mode dispersion values at the output of the high birefringent optical fiber section.

15. The system of claim 11 further comprising:
- circuitry for calibrating the second-order polarization mode dispersion value at the output of the high birefringent optical fiber section for each setting of the variable differential group delay module; and
- circuitry for providing a second-order PMD value by tuning the variable differential group delay module to the corresponding setting without actually measuring the resulting second-order polarization mode dispersion value at the output of the high birefringent optical fiber section.

16. A tunable second-order polarization mode dispersion system for fiber optic transmission, comprising:
- an optical fiber section of fixed high birefringent optical fiber;
- a polarization controller optically connected to the fixed high birefringent optical fiber section;
- a variable differential group delay module optically connected to the polarization controller;
- an optical signal source for inputting optical signals into the variable differential group delay module, passing the optical signals from the variable differential group delay module to the polarization controller, passing the optical signals from the polarization controller to the fixed high birefringent optical fiber section, and outputting the optical signals from an output of the fixed high birefringent optical fiber section;
- circuitry for controlling the variable differential group delay module to vary the second-order polarization mode dispersion values at the output of the fixed high birefringent optical fiber section; and
- circuitry for controlling the polarization controller to hold the mean first-order differential group delay substantially constant at the output of the fixed high birefringent optical fiber section for each value of the second-order polarization mode dispersion at the output of the fixed high birefringent optical fiber section.

17. The system of claim 16 further comprising circuitry for calibrating the polarization controller relative to the variable differential group delay module, including:
- circuitry for tuning the variable differential group delay module to a predetermined differential group delay value; and
- circuitry for tuning the polarization controller to a corresponding phase angle setting that keeps the mean first-order differential group delay substantially constant at a predetermined value at the output of the high birefringent optical fiber section.

18. The system of claim 17, further comprising:

circuitry for storing the corresponding phase angle settings for each setting of the variable differential group delay module; and circuitry for tuning the polarization controller to the stored phase angle corresponding to the setting of the variable differential group delay module.

19. The system of claim 17:

wherein the optical signal source is a tunable laser for providing test optical signals; and further comprising a polarization mode dispersion analyzer connected to the tunable laser, to the input to the variable differential group delay module, and to the output of the high birefringent optical fiber section, the polarization mode dispersion analyzer being operable for initially measuring the optical signal generated by the tunable laser, and being operable for analyzing the optical signal at the output of the high birefringent optical fiber section to compare the signal at the output of the high birefringent optical fiber section with the signal originally generated by the tunable laser, to determine the first-order differential group delay and the second-order polarization mode dispersion values at the output of the high birefringent optical fiber section.

20. The system of claim 16 further comprising:

circuitry for calibrating the second-order polarization mode dispersion value at the output of the high birefringent optical fiber section for each setting of the variable differential group delay module; and circuitry for providing a second-order PMD value by tuning the variable differential group delay module to the corresponding setting without actually measuring the resulting second-order polarization mode dispersion value at the output of the high birefringent optical fiber section.

* * * * *

UNITED STATES PATENT AND TRADEMARK OFFICE
CERTIFICATE OF CORRECTION

PATENT NO. : 6,707,587 B1
DATED : March 16, 2004
INVENTOR(S) : Zeng

It is certified that error appears in the above-identified patent and that said Letters Patent is hereby corrected as shown below:

Column 1,
Line 38, delete "arc" and insert therefore -- are --

Column 2,
Line 8, delete "attenuation/modificd-dispersion" and insert therefore -- attenuation/modified-dispersion --

Column 3,
Line 5, delete "(10 Gb/s)" and insert therefore -- ($\geq$10 Gb/s) --

Column 4,
Line 58, delete "(10 Gb/s)" and insert therefore -- ($\geq$10 Gb/s) --

Column 5,
Line 47, delete "programnable" and insert therefore -- programmable --
Line 52, delete "("DIA")" and insert therefore -- "D/A" --
Line 58, delete "Coming" and insert therefore -- Corning --
Lines 58-59, delete "(SM.15-P-8/125-UV/U-400)," and insert therefore -- (SM.15-P-8/125-UV/UV-400), --

Column 6,
Equation 1, delete
$$\bar{\Omega}_{total}(\omega) = \tau_{fixed}\vec{e}_2 + \tau_{variable}(\vec{e}_1 \cdot \vec{e}_2)\vec{e}_2 + \tau_{variable}\cos(\tau_{fixed}\omega)(\vec{e}_1 - (\vec{e}_1 \cdot \vec{e}_2)\vec{e}_2) + \tau_{variable}\sin(\tau_{fixed}\omega)(\vec{e}_1 \times \vec{e}_2)$$

and insert therefore --
$$\bar{\Omega}_{total}(\omega) = \tau_{fixed}\vec{e}_2 + \tau_{variable}(\vec{e}_1 \cdot \vec{e}_2)\vec{e}_2 + \tau_{variable}\cos(\tau_{fixed}\omega)(\vec{e}_1 - (\vec{e}_1 \cdot \vec{e}_2)\vec{e}_2) + \tau_{variable}\sin(\tau_{fixed}\omega)(\vec{e}_1 \times \vec{e}_2)$$
--

UNITED STATES PATENT AND TRADEMARK OFFICE
CERTIFICATE OF CORRECTION

PATENT NO. : 6,707,587 B1
DATED : March 16, 2004
INVENTOR(S) : Zeng

It is certified that error appears in the above-identified patent and that said Letters Patent is hereby corrected as shown below:

<u>Column 7,</u>
Line 60, delete "Coming" and insert therefore -- Corning --

Signed and Sealed this

Twenty-sixth Day of April, 2005

JON W. DUDAS
*Director of the United States Patent and Trademark Office*